United States Patent [19]
Presler-Marshall

[11] Patent Number: 5,995,977
[45] Date of Patent: Nov. 30, 1999

[54] MODULE CONFIGURATION SYSTEMS, METHODS AND COMPUTER PROGRAM PRODUCTS FOR DATA PROCESSING SYSTEMS

[75] Inventor: Martin J. C. Presler-Marshall, Chapel Hill, N.C.

[73] Assignee: International Business Machines Corporation, Armonk, N.Y.

[21] Appl. No.: 08/911,862

[22] Filed: Aug. 15, 1997

[51] Int. Cl.[6] .................................................. G06F 17/30
[52] U.S. Cl. .......................... 707/104; 707/200; 713/502; 712/10; 711/133
[58] Field of Search .................................... 707/200, 104; 395/800.1, 800.32, 557; 713/502; 712/10; 711/133

[56] References Cited

U.S. PATENT DOCUMENTS

| | | | |
|---|---|---|---|
| 5,301,350 | 4/1994 | Rogan et al. ............................ | 707/104 |
| 5,446,575 | 8/1995 | Lysakowski, Jr. ...................... | 707/104 |
| 5,634,124 | 5/1997 | Khoyi et al. ............................ | 707/103 |
| 5,740,431 | 4/1998 | Rail ........................................ | 707/200 |

OTHER PUBLICATIONS

Silbershatz et al., "Operating System Concepts 3rd Ed", Addison–Wesley Publishing Co., pp. 564–566, Dec. 1990.

*Primary Examiner*—Thomas G. Black
*Assistant Examiner*—Charles L. Rones
*Attorney, Agent, or Firm*—Myers Bigel Sibley & Sajovec; Jeanine Ray-Yarletts

[57] ABSTRACT

Modules of a data processing system are configured by providing a configuration file that includes configuration file blocks, a respective one of which contains configuration information for a respective one of the modules. A configuration file interface is also provided for each of the modules. A configuration file interface identifies the configuration file block that contains configuration information for the associated module and consumes the configuration block so identified. A pipe serially passes a configuration file block to the configuration file interfaces, until one of the configuration file interfaces identifies a configuration file block. Configuration file blocks continue to be passed until all of the configuration file blocks have been passed to the appropriate configuration file interface.

27 Claims, 3 Drawing Sheets

MODULE CONFIGURATION SYSTEMS, METHODS AND COMPUTER PROGRAM PRODUCTS FOR DATA PROCESSING SYSTEMS

FIELD OF THE INVENTION

This invention relates to data processing systems, methods and computer program products, and more particularly to configuration files for data processing systems, methods and computer program products.

BACKGROUND OF THE INVENTION

Data processing systems generally include a plurality of modules which execute on a central processing unit (CPU). An operating system may be used to interface the modules to the CPU. Each module may be a separate computer program such as a word processing or spreadsheet program, or may be a subroutine or a group of subroutines that act as a unit. It will be understood that modules may also include hardware as well as software components, such as a sound card module. An operating system may also be considered as one or more modules. Each of these modules executes in the data processing system, serially or concurrently.

In data processing system design, it has long been recognized that well-defined modules can provide a data processing system that is easy to maintain and update. Accordingly, modular programming techniques and object oriented programming techniques have been used to design well-defined modules.

In a well-defined module, the module exposes an interface that exchanges data and otherwise interacts with other modules, with an operating system and/or with the central processing unit. However, the details behind the interface, and the data and algorithms that are used to implement it, are maintained hidden within the module. Accordingly, external interaction of the module takes place only through a well-defined interface. Thus, the module is easy to maintain or upgrade by preserving the well-defined interface when changing the internal workings of the modules.

Many modules use configuration data to govern their operation. For example, a word processing program may include configuration data regarding foreground and background colors, fonts, default document formats and other configuration information. As another example, an operating system may include configuration files for control panels, printers and task bars. Accordingly, modules generally include a configuration file associated therewith.

Many modules will have common configuration parameters, such as colors, fonts, task bars and the like. In order to improve the ability to edit these configuration parameters globally, it may be desirable to provide a single configuration file as a persistent file of configuration information for all modules. This configuration file may be human-readable or may only be machine-readable. In either case, a single file for multiple modules is generally desirable to reduce clutter and improve reliability of the data processing system.

Unfortunately, the use of a single configuration file may be contrary to the provision of well-defined modules. In particular, if there is a single configuration file, and a single module that reads that configuration file, then each other module may need to expose, as part of its external interface, all of its configurable parameters. However, this may expose information which otherwise may not need to be exposed to other modules, and thus may violate the basic concepts of modular programming.

Moreover, if a module changes a configuration parameter, the configuration file reading module may also need to change. Again, this may violate the principles of modular programming.

SUMMARY OF THE INVENTION

It is therefore an object of the present invention to provide improved systems, methods and computer program products for configuring a plurality of modules in data processing systems.

It is another object of the present invention to provide configuration systems, methods and computer program products that can be consistent with modular programming concepts.

It is still another object of the present invention to provide configuration systems, methods and computer program products that can be consistent with modular programming, yet only use a single configuration file.

These and other objects are provided according to the present invention by a configuration file that includes a plurality of configuration file blocks, a respective one of which contains configuration information for a respective one of the modules running on a data processing system. A plurality of configuration file interfaces is also provided, a respective one of which is associated with a respective one of the modules. The configuration file interfaces identify the configuration file block that contains configuration information for the respective one of the modules and consumes the configuration block so identified.

A pipe is responsive to the configuration file and to the configuration file interfaces to serially pass a configuration file block to the plurality of configuration file interfaces, until one of the configuration file interfaces identifies a configuration file block. As is well known to those having skill in the art, a pipe is a data processing structure that can be used to carry data between processes. One process writes into one end of the pipe, and another process reads from the other end.

By providing a pipe from the configuration file to the plurality of configuration file interfaces, a configuration file block is read from the configuration file and is passed from configuration file interface to configuration file interface, down the pipe, until the appropriate interface identifies the configuration file block and consumes the block. These operations can be performed for each of the configuration blocks of the configuration file, until each of the blocks has been identified and consumed by the associated configuration file interface.

Thus, a central configuration file may be maintained. Moreover, each configuration file interface can provide the same functionality between the pipe and the associated module. The configuration file interface consumes the configuration file block that was properly identified and otherwise passes the block back to the pipe for the next interface. Each module need not expose its internal interface, and can receive configuration data the same way. Thus, modularity can be maintained.

According to other aspects of the invention, if none of the configuration file interfaces identifies a configuration file block, an error is generated. Once the associated module has obtained a configuration file block from the associated configuration file interface, the configuration file block is used to configure the associated module. A configuration controller may be used to control the configuration file and the pipe.

Accordingly, a first configuration file block is serially passed to the plurality of modules, until one of the modules identifies the configuration file block. The remaining configuration file blocks are then serially passed to the plurality of modules, until one of the modules identifies each of the remaining configuration file blocks. Well-defined modular architectures may be provided, while still allowing a central configuration file to be used.

It will be understood that the present invention can be provided in the form of systems (apparatus), methods, computer program products and combinations thereof.

DETAILED DESCRIPTION OF PREFERRED EMBODIMENTS

The present invention now will be described more filly hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout.

Figure 1:
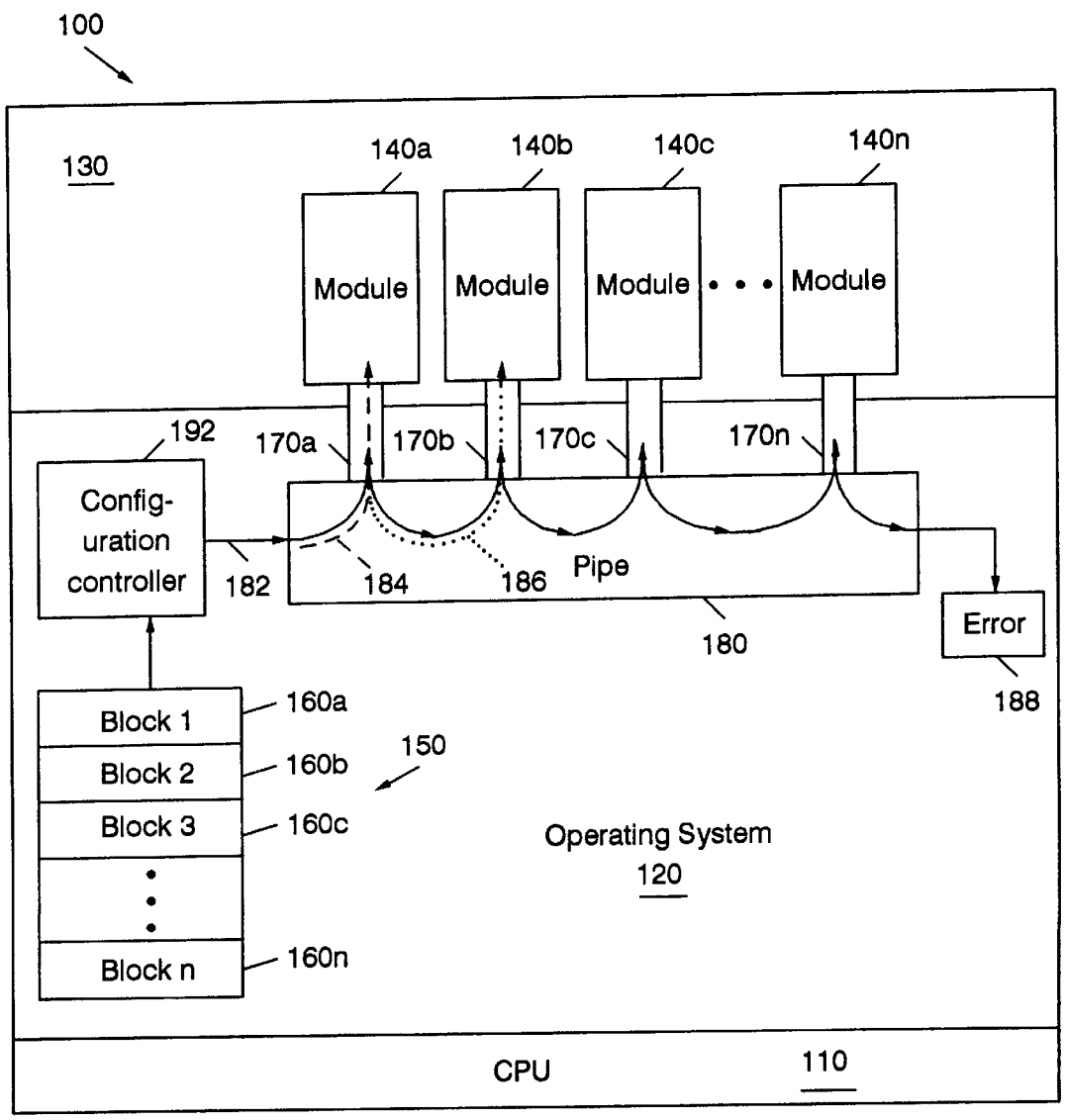
FIG. 1 is a block diagram of data processing systems including modular configuration according to the present invention.

Referring now to FIG. 1, a data processing system including module configuration according to the present invention will now be described. As shown in FIG. 1, data processing system 100 includes a central processing unit (CPU) 110 and an operating system 120. An application layer 130 includes a plurality of modules 140a–140n that run on the data processing system. The design of operating system 120 and application layer 130 are well known to those having skill in the art and need not be described further herein.

Still referring to FIG. 1, a configuration file 150 is included in operating system 120. Configuration file 150 includes a plurality of configuration blocks 160a–160n, a respective one of which contains configuration information for a respective one of the modules 140a–140n. It will be understood that the blocks 160a–160n need not be stored in configuration file 150 in any particular sequence.

A plurality of configuration file interfaces 170a–170n is also included in FIG. 1. A respective configuration file interface 170a is associated with a respective one of the modules 140a–140n. Each configuration file interface 170a–170n includes the functionality to identify the configuration block 160a–160n that contains the configuration information for the respective one of the modules 140a–140n, and for consuming the configuration block so identified. Thus, for example, configuration file interface 170b contains the functionality to identify configuration file 160b and to provide this configuration block to the associated module 140b.

The configuration file interfaces are responsive to a pipe 180. As shown by solid line 182, the pipe serially passes a configuration file block 160a–160n to the plurality of configuration file interfaces 170a–170n until one of the configuration file interfaces identifies the configuration file block. Pipes are well known to those having skill in the programming art. Pipes are also sometimes referred to as "pipelines" and are described in Section 15.4.3 of "Operating System Concepts, Third Edition" by Silberschatz et al., 1991, at pages 564–566, the disclosure of which is hereby incorporated herein by reference. It will be understood that pipe 180 can be implemented using tables, linked lists or other conventional programming techniques. Finally, still referring to FIG. 1, a configuration controller 190 is used to control the pipe 180 and the configuration file 150.

It will be understood by those having skill in the art that all of the modules 140a–140n are illustrated as being in the application layer 130. However, modules may also exist in the operating system 120 because configuration according to the present invention may be used with configuration files for an operating system as well. Similarly, although configuration file 150, pipe 180 and configuration controller 192 are illustrated as being in operating system 120, they may also be provided as a module 140a–140n in application layer 130. Finally, although the configuration file interfaces 170a–170n are shown bridging the application layer 130 and the operating system 120, they may reside totally in application layer 130 or in operating system 120.

Three examples of configuration according to the present invention will now be described, using solid line 182, dashed line 184 and dotted line 186 of FIG. 1.

As shown by dashed line 184, a first configuration file block 160a is passed by configuration controller 192 to pipe 180. Configuration file interface 170a identifies this configuration file block as being associated with module 140a, and consumes the configuration file block so identified, so that it is not passed to remaining modules 140b–140n. The configuration file interface 170a provides the configuration block 160a to the associated module 140a and the module 140a configures itself according to the configuration block 160a.

As shown by dotted line 186, the second configuration file block 160b is then obtained from configuration file 150 by configuration controller 192. It is serially passed to the first configuration file interface 170a which does not identify it as being associated with module 140a, so that it does not consume the second configuration block 160b. Thus, as shown by dotted line 186, the second configuration block is passed to second configuration file interface 170b, which identifies the second configuration file block 160b as being associated with module 140b, and consumes this configuration file block. Thus, configuration file block 160b is not passed to modules 140c–140n.

Solid line 182 illustrates a configuration file block which is passed through all of the configuration file interfaces 170a–170n without being identified. It therefore passes through the pipe 180 and is flagged as an error in block 188.

Figure 2:
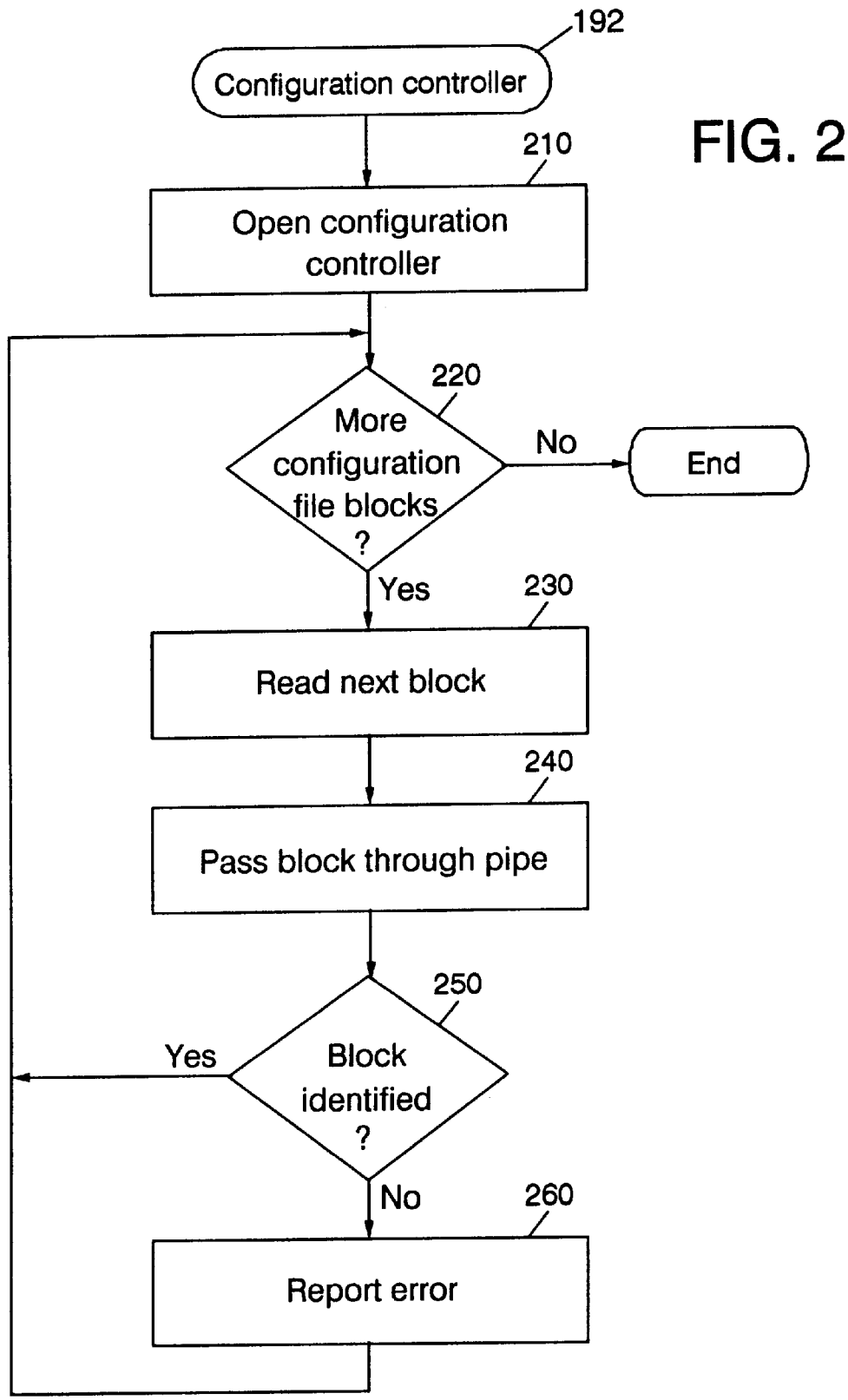
FIG. 2 is a flowchart illustration of a configuration controller of FIG. 1.
Figure 3:
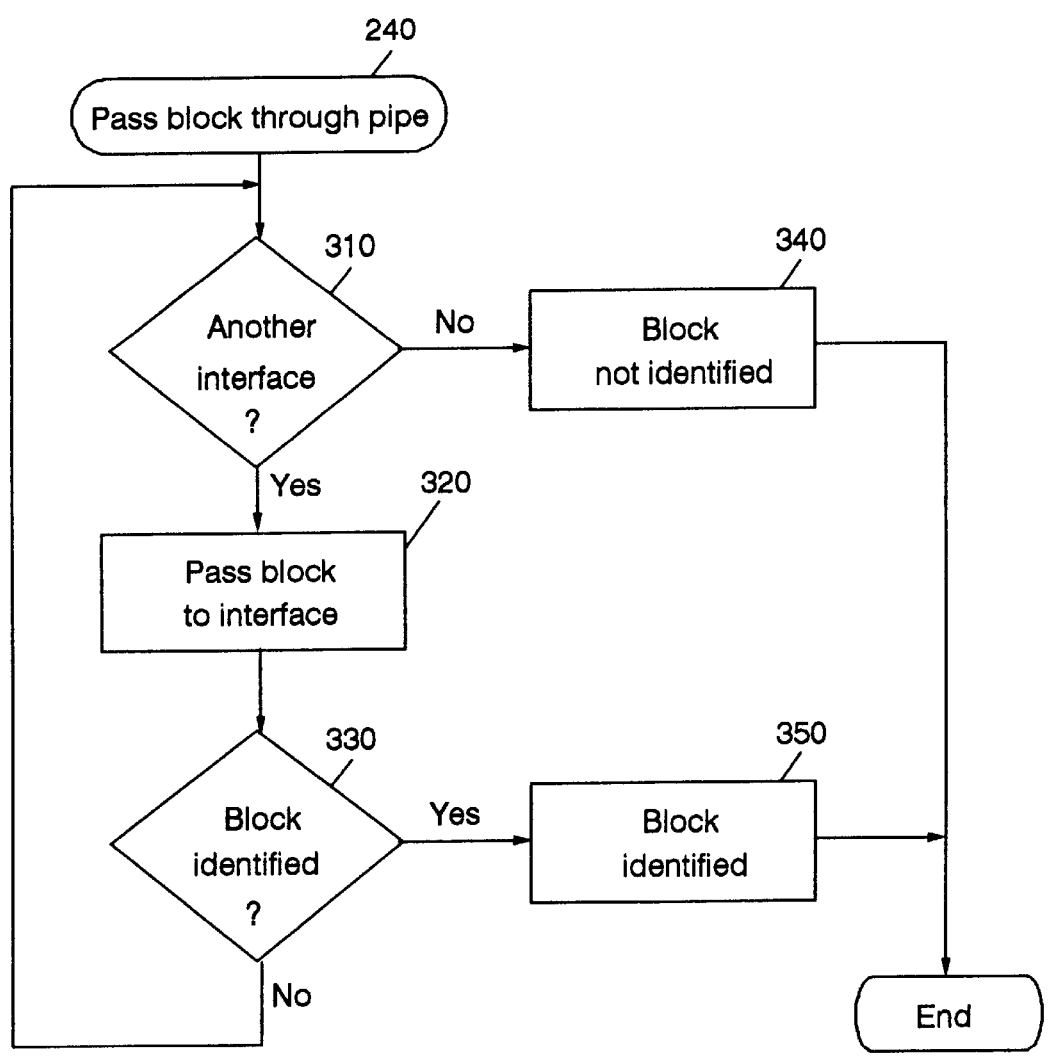
FIG. 3 is a flowchart illustration of passing a block through a pipe of FIG. 2.

The configuration controller 192 is described in detail in FIGS. 2 and 3. FIGS. 2 and 3 are flowchart illustrations. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Referring now to FIG. 2, the configuration controller 192 allows a plurality of modules 140a–140n to read their appropriate configuration file block 160a–160n in order for the modules to configure themselves.

At Block 210, initialization takes place by opening the configuration controller 192. In particular, a central or main module may begin running in the data processing system, and the main module may cause other modules in the system to initialize themselves. A first module to be initialized may be the configuration controller 190.

The configuration controller maintains a list of modules that include a configuration block 160a–160n in the configuration file 150. Initially, that list is set to be an empty list. As each other module in the system initializes, if it has configurable parameters, the associated configuration file interface 170a–170n module informs the configuration controller that it includes a configuration block in the configuration file.

The configuration controller maintains the list of registered configuration file interfaces.

After all the initializations are performed, the main module can cause the onfiguration controller 190 to load the configuration file. As shown at Block 220, the configuration controller determines whether configuration file blocks 160 in the configuration file 150 are unread. If yes, then the next configuration file block 160a–160n is read at Block 230. At Block 240, the block is passed through the pipe by passing through each of its registered configuration file interfaces 170a–170n that were obtained during initialization, until one of the configuration file interfaces indicates, at Block 250, that it has identified the configuration file block. Once identified, the next configuration file block is read at Block 220. If a configuration file block passes through all of the configuration file interfaces, the configuration controller 190 reports this information as an error at Block 260 using conventional error reporting schemes.

FIG. 3 illustrates blocks passing through the pipe (Block 240) of FIG. 2. In particular, at Block 310, a test is made as to whether another configuration file interface 170a–170n is present in the set of configuration file interfaces. If another configuration file interface is present, then the block is passed to that interface at Block 320. At Block 330, if the block is not identified by that interface 170a–170n, then a test is made at Block 310 as to whether other interfaces remain. If the configuration file block has been passed to the last interface, then an indication is provided at Block 340 that the configuration file block was not identified. Conversely, when the block is identified at Block 330, an indication is provided at Block 350 that the block was identified.

Accordingly, the configuration file 150 is parsed to the appropriate module 140a–140n. Each module 140a–140n contains a configuration file interface 170a–170n that is responsible for recognizing the associated module's configurable parameters. This is consistent with modular programming ideals by providing a technique to maintain a single configuration file, and is easily extendable when new modules are defined.

It will be understood that in order to provide efficient operation, it may be desirable for the configuration file to have recognizable configuration file blocks 160a–160n that can be parsed in a context-free manner. For example, a human-readable configuration file might use lines of text as its configuration file blocks. Similarly, it is preferable for all of the configuration file interfaces, which perform the parsing functions, to have a common calling convention. These characteristics may be readily provided in data processing systems.

Accordingly, a single configuration file may be maintained, but each module can contain its own configuration file parsing interface. This can greatly increase modularity. It can eliminate the need for a single global configuration structure or object that may violate the concept of modular programming. Accordingly, modularity may be maintained, while allowing a single configuration file to be used.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for configuring a plurality of modules running on a data processing system, the configuring method comprising the steps of:

providing a configuration file including a plurality of configuration file blocks, a respective one of which contains configuration information for a respective one of the modules;

serially passing a first configuration file block to the plurality of modules, until one of the modules identifies the configuration file block; and repeating the serially passing step for remaining configuration file blocks until all the configuration file blocks have been passed.

2. A method according to claim 1 further comprising the step of generating an error if none of the modules identifies a configuration file block.

3. A method according to claim 1 further comprising the following step that is performed by each module:

configuring the associated module according to the configuration file block that is identified by the associated module.

4. A system for configuring a plurality of modules running on a data processing system, the configuring system comprising:

a configuration file including a plurality of configuration file blocks, a respective one of which contains configuration information for a respective one of the modules;

a plurality of configuration file interfaces, a respective one of which is associated with a respective one of the modules, the configuration file interfaces identifying the configuration file block that contains configuration information for the respective one of the modules and consuming the configuration file block so identified; and a pipe that is responsive to the configuration file and to the configuration file interfaces, to serially pass a configuration file block to the plurality of configuration file interfaces, until one of the configuration file interfaces identifies the configuration file block.

5. A system according to claim 4 wherein the pipe generates an error if none of the configuration file interfaces identifies the configuration file block.

6. A system according to claim 4 wherein the configuration file interfaces provide the configuration file block so identified to the associated module.

7. A system according to claim 6 wherein the associated module configures itself according to the configuration file block that is provided by the associated configuration file interface.

8. A system according to claim 4 wherein each of the configuration file interfaces provides same functionality.

9. A system according to claim 4 further comprising a configuration controller that sequentially provides succeeding blocks of the configuration file to the pipe.

10. A data processing system comprising:

a plurality of modules running on the data processing system;

a configuration file including a plurality of configuration file blocks, a respective one of which contains configuration information for a respective one of the modules;

a plurality of configuration file interfaces, a respective one of which is associated with a respective one of the modules, the configuration file interfaces identifying the configuration file block that contains configuration information for the respective one of the modules and consuming the configuration file block so identified; and a pipe that is responsive to the configuration file and to the configuration file interfaces, to serially pass a configuration file block to the plurality of configuration file interfaces, until one of the configuration file interfaces identifies the configuration file block.

11. A system according to claim 10 wherein the pipe generates an error if none of the configuration file interfaces identifies the configuration file block.

12. A system according to claim 10 wherein the configuration file interfaces provide the configuration file block so identified to the associated module.

13. A system according to claim 12 wherein the associated module configures itself according to the configuration file block that is provided by the associated configuration file interface.

14. A system according to claim 10 wherein each of the configuration file interfaces provides same functionality.

15. A system according to claim 10 further comprising a configuration controller that sequentially provides succeeding blocks of the configuration file to the pipe.

16. A system for configuring a plurality of modules running on a data processing system, the configuring system comprising:

a configuration file including a plurality of configuration file blocks, a respective one of which contains configuration information for a respective one of the modules;

a plurality of configuration file interfaces, a respective one of which is associated with a respective one of the modules, the configuration file interfaces each including means for identifying the configuration file block that contains configuration information for the respective one of the modules and means for consuming the configuration file block so identified; and means, responsive to the configuration file and to the configuration file interfaces, for serially passing a configuration file block to the plurality of configuration file interfaces, until one of the configuration file interfaces identifies the configuration file block.

17. A system according to claim 16 wherein the passing means further comprises means for generating an error if none of the configuration file interfaces identifies the configuration file block.

18. A system according to claim 16 wherein the configuration file interfaces further comprises means for providing the configuration file block so identified to the associated module.

19. A system according to claim 18 wherein each module further comprises means for configuring the module according to the configuration file block that is provided by the associated configuration file interface.

20. A system according to claim 16 wherein each of the configuration file interfaces provides same functionality.

21. A system according to claim 16 further comprising means for sequentially providing succeeding blocks of the configuration file to the serially passing means.

22. A computer program product for configuring a plurality of modules running on a data processing system, the computer program product comprising a computer-readable storage medium having computer-readable program code means embodied in the medium, the computer-readable program code means comprising:

computer-readable program code means for providing a configuration file including a plurality of configuration file blocks, a respective one of which contains configuration information for a respective one of the modules;

computer-readable program code means for providing a plurality of configuration file interfaces, a respective one of which is associated with a respective one of the modules, the configuration file interfaces each including computer-readable program code means for identifying the configuration file block that contains configuration information for the respective one of the modules and computer-readable program code means for consuming the configuration file block so identified; and computer-readable program code means, responsive to the configuration file and to the configuration file interfaces, for serially passing a configuration file block to the plurality of configuration file interfaces, until one of the configuration file interfaces identifies the configuration file block.

23. A system according to claim 22 wherein the passing means further comprises computer-readable program code means for generating an error if none of the configuration file interfaces identifies the configuration file block.

24. A system according to claim 22 wherein the configuration file interfaces further comprises computer-readable program code means for providing the configuration file block so identified to the associated module.

25. A system according to claim 24 wherein each module further comprises means for configuring the module according to the configuration file block that is provided by the associated configuration file interface.

26. A system according to claim 22 wherein each of the configuration file interfaces provides same functionality.

27. A system according to claim 22 further comprising computer-readable program code means for sequentially providing succeeding blocks of the configuration file to the serially passing means.

* * * * *